US009197924B2

(12) United States Patent
Howard, Jr.

(10) Patent No.: US 9,197,924 B2
(45) Date of Patent: Nov. 24, 2015

(54) CONTENT DISCOVERY AND PLAYBACK IN A NETWORK ENVIRONMENT

(71) Applicant: Time Warner Cable Enterprises LLC, New York, NY (US)

(72) Inventor: William Lee Howard, Jr., Fairfax, VA (US)

(73) Assignee: Time Warner Cable Enterprises LLC, New York, NY (US)

( * ) Notice: Subject to any disclaimer, the term of this patent is extended or adjusted under 35 U.S.C. 154(b) by 0 days.

(21) Appl. No.: 14/506,832

(22) Filed: Oct. 6, 2014

(65) Prior Publication Data

US 2015/0033265 A1    Jan. 29, 2015

Related U.S. Application Data

(63) Continuation of application No. 13/719,719, filed on Dec. 19, 2012, now Pat. No. 8,925,017.

(51) Int. Cl.
| | |
|---|---|
| *H04N 21/431* | (2011.01) |
| *H04N 21/462* | (2011.01) |
| *H04N 21/2665* | (2011.01) |
| *H04N 21/435* | (2011.01) |
| *H04N 21/4782* | (2011.01) |
| *H04N 21/482* | (2011.01) |

(52) U.S. Cl.
CPC ......... *H04N 21/431* (2013.01); *H04N 21/2665* (2013.01); *H04N 21/435* (2013.01); *H04N 21/4314* (2013.01); *H04N 21/4622* (2013.01); *H04N 21/4782* (2013.01); *H04N 21/482* (2013.01)

(58) Field of Classification Search
CPC .............. H04N 21/84; H04N 5/44543; H04N 21/4622; H04N 21/435; H04N 21/482
USPC .................................................. 725/48, 51–52
See application file for complete search history.

(56) References Cited

U.S. PATENT DOCUMENTS

| | | | | |
|---|---|---|---|---|
| 8,925,017 | B1 * | 12/2014 | Howard, Jr. | 725/51 |
| 2009/0022476 | A1 * | 1/2009 | Nonoyama | 386/83 |
| 2012/0227077 | A1 * | 9/2012 | Spivack et al. | 725/110 |

* cited by examiner

*Primary Examiner* — Hunter B Lonsberry
(74) *Attorney, Agent, or Firm* — Chapin IP Law, LLC

(57) ABSTRACT

A processing resource detects that a subscriber entity subscribes to at least a first content service provider and a second content service provider. The processing resource receives a first message indicating content available to the subscriber entity for selective retrieval from the first content service provider. The processing resource receives a second message indicating content available to the subscriber entity for selective retrieval from the second content service provider. Based on at least the first message and the second message, the processing resource produces a content guide to include at least first content available to the subscriber entity for retrieval from the first service provider and second content available to the subscriber entity for retrieval from the second service provider. Via display of the content guide, a respective subscriber is able to view content available from multiple service providers.

30 Claims, 12 Drawing Sheets

CONTENT DISCOVERY AND PLAYBACK IN A NETWORK ENVIRONMENT

RELATED APPLICATIONS

This application is a continuation application of earlier filed U.S. patent application Ser. No. 13/719,719 entitled "CONTENT DISCOVERY AND PLAYBACK IN A NETWORK ENVIRONMENT," filed on Dec. 19, 2012, the entire teachings of which are incorporated herein by this reference.

BACKGROUND

Conventional cable networks often support multiple types of retrieval of content. For example, conventional cable networks typically support retrieval of cable television content via use of a so-called set-top box. In certain instances, an input of the set-top box is typically coupled to a shared cable to receive content from a cable network service provider; an output of the set-top box is coupled to a playback device such as a television display screen. Among other functions, the subscriber controls the set-top box to tune to one or more different available cable channels of content received on the shared cable to play back selected cable channel content on a respective television display screen.

Conventional cable networks also typically support Internet services via use of a so-called cable modem. One port of the cable modem is coupled to the shared cable; another port of the cable modem is coupled to a computer device or gateway device operated in the home environment. The cable modem enables the subscriber operating the computer device to communicate over the shared cable and request retrieval of so-called over-the-top content from any of one or more web servers. In a reverse direction, the cable modem enables the subscriber to receive requested content for playback on the computer device.

One way to notify a respective subscriber of available content is to provide a channel guide. In response to receiving input from the subscriber to view a channel guide of available content, a set-top box initiates display of a cable service provider generated list of available titles of content that are available from the content service provider. In certain instances, such as a guide displaying scheduled linear television content, the user can select from the titles of content available in the channel guide to tune to a respective channel.

BRIEF DESCRIPTION OF EMBODIMENTS

Conventional techniques of utilizing content guides suffer from a number of deficiencies. For example, in many instances, as previously discussed, a user must view a standardized content guide produced by a respective service provider to view available content from a particular content service provider. For example, to view titles of corresponding content that is available from a first content service provider such as a cable network service provider, the subscriber relies on use of an in the set-top box to initiate display of the cable network service provider's program guide. To view titles of corresponding content that are available from a second content service provider (e.g., an over-the-top service provider) such as Netflix™, the subscriber utilizes a second application to initiate display of the second service provider's content guide to view available content. Unfortunately, to view content available from different service providers, the subscriber must switch between operating different devices to view content available from the different service providers.

Embodiments herein deviate with respect to conventional techniques. For example, one embodiment herein is directed to producing a consolidated content guide indicating content available from different service providers. The content guide can include titles of content available for retrieval (via a cable network connection) from a cable network service provider as well as titles of over-the-top content available for retrieval (via an Internet service) from a second service provider to produce a consolidated content guide.

More specifically, in accordance with a first embodiment, a processing resource detects that a subscriber entity subscribes to at least a first content service provider and a second content service provider. The processing resource receives a first message indicating content available to the subscriber entity for retrieval from the first content service provider. The processing resource receives a second message indicating content available to the subscriber entity for retrieval from the second content service provider. Retrieval by the client can include selective retrieval, scheduled retrieval, scheduled to record, scheduled playback, etc. Based on at least the for message and the second message, the processing resource produces a content guide to include at least first content available to the subscriber entity for retrieval from the first service provider and second content available to the subscriber entity for retrieval from the second service provider. By way of a non-limiting example, via display of a rendition of the consolidated content guide, a respective subscriber is able to view available content from multiple different service providers.

In one example embodiment, the first content service provider is a cable network service provider; the second content service provider is an over-the-top content service provider. By further way of a non-limiting example, the consolidated content guide indicates first content available for retrieval from the cable network service provider. The consolidated content guide also indicates second content such as over-the-top content available for retrieval from the second content service provider. In one embodiment, the over-the-top content from the second content service provider is available for retrieval from the second content service provider over IP services provided by the first content service provider.

In accordance with another embodiment, a processing resource in a network environment monitors a shared cable network path. The shared cable network path is managed by a first content service provider. Assume that the processing resource detects presence of a message transmitted to a subscriber domain over the shared cable network path. Assume further that the detected message indicates content available for retrieval by the subscriber from the second content service provider. The processing resource communicates availability of the content as indicated by the message to a remotely located processing resource managed by the first content service provider. Accordingly, embodiments herein can include redirecting content advertisement messages (as generated by a second content service provider) to a first content service provider. In one non-limiting example, the term redirect as discussed herein means to transmit a copy of an original message. The original message can be forwarded to an originally intended recipient. In another non-limiting example embodiment, the term redirect can mean to transmit the message originally intended to an alternative destination. For example, the original message can be directed to a subscriber. The original message can be rerouted to an alternative source.

In one embodiment, the first content service provider utilizes the content advertisement messages from the second content service provider to produce a consolidated content guide as discussed herein.

In accordance with yet another embodiment, a processing resource is configured to receive a content advertisement message from each of multiple resources in a network environment. Each of the content advertisement messages can indicate availability of respective content from a corresponding resource in the network environment. The processing resource produces a consolidated list indicating from which of the multiple resources the respective content is available for retrieval. The list indicates availability of content from different resources. The processing resource then distributes the consolidated list to a target resource in the network environment.

In one non-limiting example embodiment, the processing resource forwards the consolidated list, which indicates different available content, to a server resource managed by a cable network service provider. The server resource managed by the cable network service provider produces a consolidated content guide to include content as specified by the consolidated list as well as content available from the cable network service provider.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, apparatus, computer program product, etc., that supports operations as discussed herein.

One embodiment includes a computer readable storage medium and/or system having instructions stored thereon. The instructions, when executed by a processor of a respective computer device, cause the processor or multiple processors of the system to: detect that a subscriber entity subscribes to at least a first content service provider and a second content service provider; receive a first message indicating content available to the subscriber entity for selective retrieval from the first content service provider; receive a second message indicating content available to the subscriber entity for selective retrieval from the second content service provider; and produce a content guide to include at least first content available to the subscriber entity for retrieval from the first service provider and second content available to the subscriber entity for retrieval from the second service provider.

Another embodiment as discussed herein includes a computer readable storage medium and/or system having instructions stored thereon. The instructions, when executed by a processor of a respective computer device, cause the processor or multiple processors of the system to: monitor a shared cable network path managed by a first content service provider; detect presence of a message transmitted to a subscriber over the shared cable network path, the message indicating content available for retrieval by the subscriber from the second content service provider; and communicate availability of the content as indicated by the message to a server resource managed by the first content service provider.

Yet another embodiment includes a computer readable storage medium and/or system having instructions stored thereon. The instructions, when executed by a processor of a respective computer device, cause the processor or multiple processors of the system to: receive a content advertisement message from each of multiple resources in a network environment, each of the content advertisement messages indicating availability of respective content from a corresponding resource in the network environment; produce a consolidated list indicating from which of the multiple resources the respective content is available for retrieval; and distribute the consolidated list to a target resource in the network environment.

The ordering of the steps in the above embodiments has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, hardware alone such as within a processor, within an operating system, within a software application, etc.

Techniques herein are well suited for use in network environments supporting distribution of content from different content service providers. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in any combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

Figure 1:
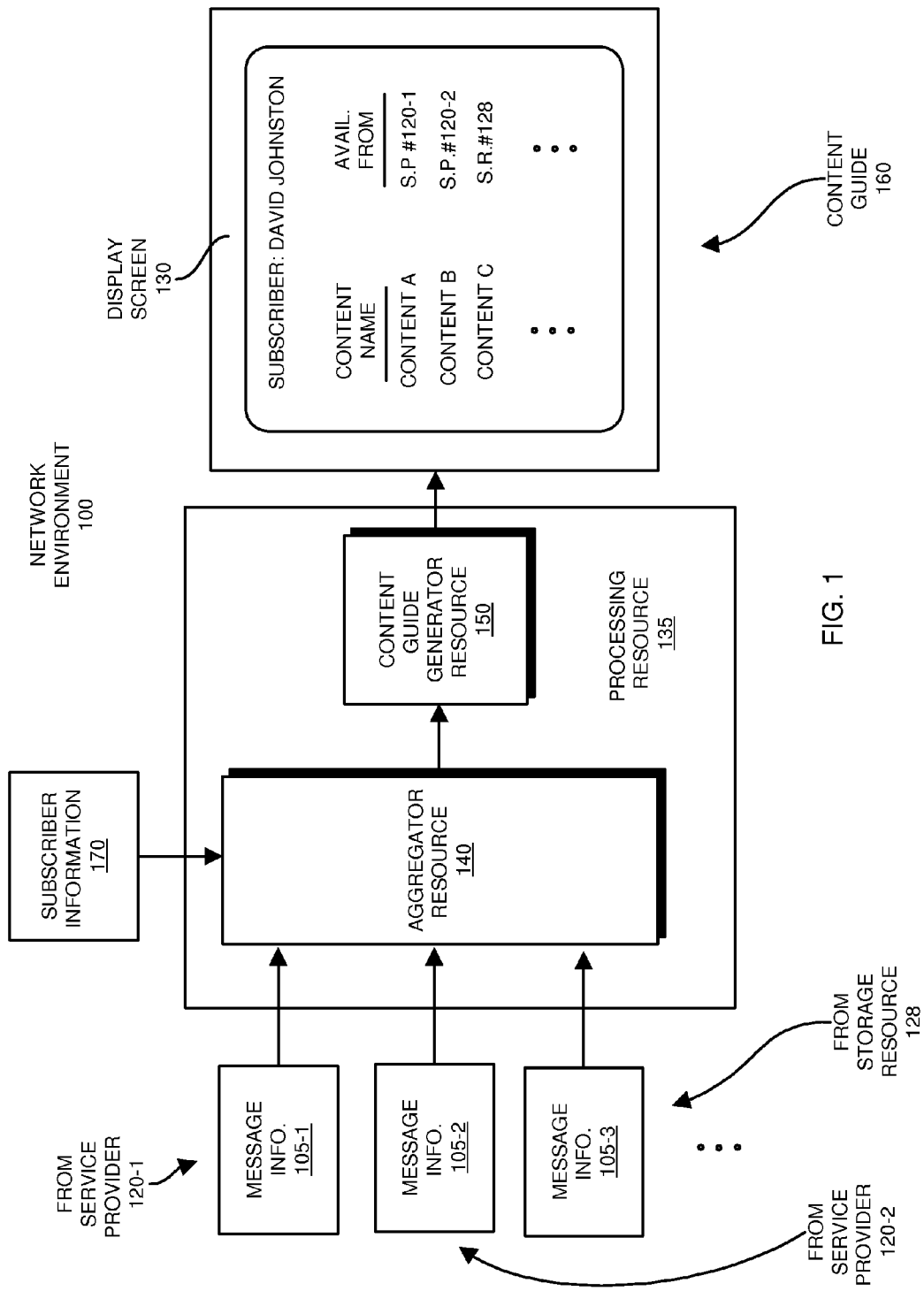
FIG. 1 is an example diagram illustrating aggregation of information and generation of a consolidated content guide according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

As discussed above, by way of a non-limiting example embodiment, a processing resource detects that a subscriber entity subscribes to at least a first content service provider and a second content service provider. The processing resource receives a first message indicating content available to the subscriber entity for selective retrieval from the first content service provider. The processing resource receives a second message indicating content available to the subscriber entity for selective retrieval from the second content service provider. Based on aggregation of at least the first message and the second message, the processing resource produces a consolidated content guide to indicate at least first content available to the subscriber entity for retrieval from the first service provider and second content available to the subscriber entity for retrieval from the second service provider.

Via display of the consolidated content guide, a respective subscriber is able to view content available from multiple service providers. As further described herein, a redirector resource can be used to facilitate forwarding of content availability information to a respective aggregator resource that produces the consolidated content guide.

As discussed herein, embodiments herein include producing a consolidated guide, where a corresponding user can look for a video title and learn all of the different ways they can watch that title. The consolidated content guide can indicate content available from a local hard drive, content available from a networked PC, content available from a cable network environment channel lineup, video on demand, etc. The consolidated content guide can be extended to include VoD (Video on Demand) mechanisms, such as pricing from different sources.

FIG. 1 is an example diagram illustrating aggregation of information and generation of a content guide according to embodiments herein.

One embodiment herein includes a processing resource 135 disposed in network environment 100. In this example embodiment, processing resource 135 includes an aggregator resource 140 and a content guide generator resource 150. The aggregator resource 140 and the content guide generator resource 150 can be co-located or located at different locations in network environment 100.

As its name suggests, content guide generator resource 150 generates a content guide 160 for respective subscriber David Johnston.

In one embodiment, the subscriber David Johnston subscribes to multiple different content retrieval services. For example, assume that David Johnston subscribes to a first content plan in which the subscriber has access to content available from a first content service provider 120-1. Assume that David Johnston subscribes to a second content plan in which the subscriber has access to content available from a second content service provider 120-2.

Subscriber information 170 can be configured to indicate information such as the one or more services to which the subscriber subscribes.

In one non-limiting example embodiment, to generate the content guide 160, the processing resource 135 first determines to which of one or more one or more services a user subscribes. In this example, the processing resource 135 accesses subscriber information 170. Subscriber information 170 can indicate the different content delivery services (e.g., cable network services, Netflix™, etc.) to which a user subscribes. The subscriber information 170 can be received from any suitable type of resource such as from the subscriber, third parties (e.g., Netflix™), etc. d Assume in this example that the processing resource 135 detects that the user (e.g., David Johnston) subscribes to multiple content service providers including first content service provider 120-1 and a second content service provider 120-2.

The subscriber information 170 can be stored in any suitable resource accessible to the processing resource 135. In one embodiment, the subscriber provides notification to which of one or more streaming content services the subscriber subscribes. In this example, assume that the subscriber subscribes to both a first content service provider 120-1 and a second content service provider 120-2.

Further, in this example embodiment, assume that the aggregator resource 140 receives first message information 105-1 (e.g., content availability information) indicating content available to the subscriber David Johnston for selective retrieval from the first content service provider 120-1.

Assume that the aggregator resource 140 also receives message information 105-2 (e.g., content availability information) indicating content available to the subscriber David Johnston for selective retrieval from the second content service provider 120-2. As further discussed herein, note that the aggregator resource 140 can passively receive message from other source or the aggregator resource 140 may send out requests for such information. In accordance with one embodiment, the aggregator resource 140 (or other device) in the network environment may generate a query such as "Do you have any content?" or "Do you have the Wizard of Oz?"

The aggregator resource 140 may also receive additional content availability information such as message information 105-3 indicating content available to the subscriber David Johnston for selective retrieval from the storage resource 128 (such as a repository located in a respective subscriber domain).

In this non-limiting example, the message information 105-1 indicates that the subscriber David Johnston is able to access content A from content service provider 120-1; the message information 105-2 indicates that the subscriber David Johnston is able to access content B from content service provider 120-2; the message information 105-3 indicates that the subscriber David Johnston is able to access content C from storage resource 128, and so on.

In a specific non-limiting example embodiment, the aggregator resource 140 processes the message 105-1 to identify at least a first title of corresponding content available for retrieval by the subscriber from the first content service provider 120-1. The aggregator resource 140 processes the message information 105-2 to identify at least a second title of corresponding content available for retrieval by the subscriber from the second content service provider 120-2. The aggregator resource 140 processes message information 105-3 from a storage resource 128 located in network environment 100. In such an embodiment, the content guide generator resource 150 produces the content guide 160 to include the first title (e.g., the movie "Gone With The Wind") of corresponding content A and the second title (e.g., "The Wizard of Oz") of corresponding content B, etc.

In certain instances, the same content can be available from multiple different subscribers. For example, message information 105 can indicate that "Gone with the Wind" is available from both service provider 120-1 and service provider 120-2. In such an instance, a respective generated content guide 160 would indicate that content A is available from both content service provider 120-1 and content service provider 120-2.

The content guide generator resource 150 produces the content guide 160 to include a link, reference, etc., to content C such as personal content storage resource 128 in subscriber domain.

Based on the received message information 105-1, 105-2, 105-3, etc., (i.e., content availability information received from one or more different resources) the content guide generator resource 150 produces a content guide 160 to include: i) a title of first content (e.g., content A) available to the subscriber entity (e.g., David Johnston) for retrieval from the first service provider 120-1, ii) a title of second content (e.g., content B) available to the subscriber entity for retrieval from the second service provider 120-2, iii) a title of third content (e.g., content C) available to the subscriber entity for retrieval from the storage resource 128 (e.g., a storage resource located in a subscriber domain), etc.

Thus, content guide 160 can indicate availability of locally or remotely stored content available accessible by the subscriber David Johnston.

If desired, the content guide 160 as produced by the content guide generator resource 150 can provide an indication from which location, device, resource, etc., and/or which content service provider respective content is available. For example, as shown, the content guide generator resource 150 can produce the content guide 160 to include an indication that content A is available for retrieval from the first content service provider 120-1. The content guide generator resource 150 can generate the content guide 160 to include an indication that the content B is available for retrieval from the second content service provider 120-2. The content guide generator resource 150 can generate the content guide 160 to include an indication that the content C is available for retrieval from respective storage resource 128 in the home network environment or subscriber domain in which the subscriber resides, and so on.

As discussed below in more detail, the content guide generator resource 150 can produce the content guide 160 to include further information such as the cost associated with retrieval of respective content from the different content service providers, different levels of quality available for viewing the respective content, when the content is available for viewing, a name of a respective resource that stores the content, a location of the content, etc.

Figure 2:
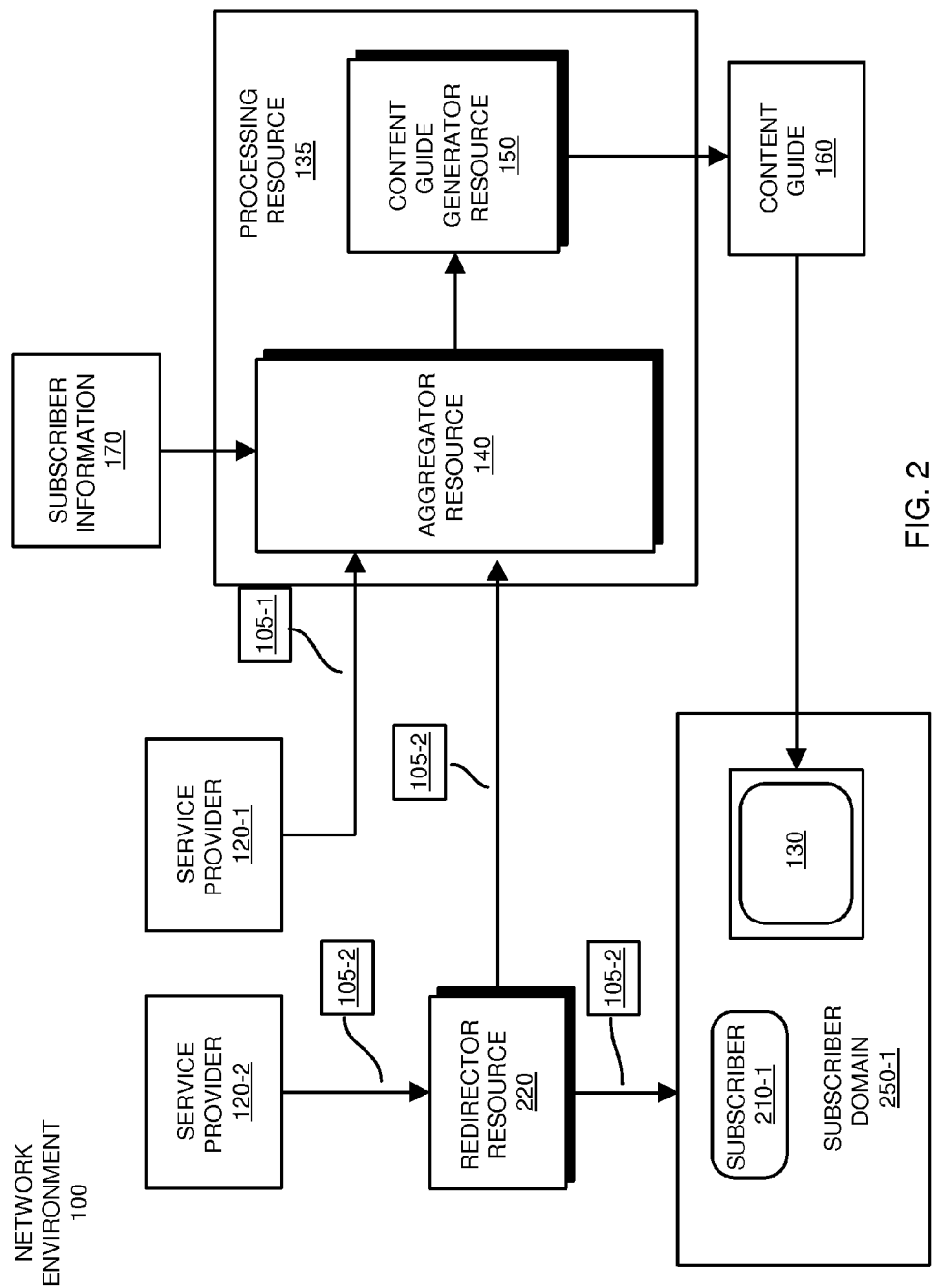
FIG. 2 is an example diagram illustrating redirection of content advertisement messages to create consolidated content guide according to embodiments herein.

FIG. 2 is an example diagram illustrating redirection of content advertisement messages according to embodiments herein.

As shown, content service provider 120-2 can be configured to generate message information 105-2 including information about content available for retrieval by the subscriber 210-1 (e.g., David Johnston) residing in subscriber domain 250-1.

In one embodiment, network environment 100 includes a redirector resource 220. By way of a non-limiting example, redirector resource 220 can be configured to monitor data traffic (e.g., messages, data packets, content availability information, etc.) passing through a shared cable network path managed by the first content service provider 120-1.

Based on the monitoring, assume that the redirector resource 220 detects presence of message information 105-2 transmitted to subscriber 210-1 over the shared cable network path. Assume also that the redirector resource 220 processes the message information 105-2 and detects that the message information 105-2 indicates content available for retrieval by the subscriber 210-1 from a second content service provider 120-2.

In one embodiment, the message information 105-2 represents one or more content advertisement messages transmitted in or across multiple networks. In one embodiment, the content service provider 120-2 generates the content advertisement messages to indicate availability of content. The content advertisement messages can indicate titles of available content, formatting of the available content, etc.

The redirector resource 220 may allow further transmission of the message information 105-2 to a target device in subscriber domain 250-1 as originally intended by the content service provider 120-2. In other words, the redirector resource 220 can be configured to intercept message information 105-2, process the received message information 105-2 to learn that the message information 105-2 is a content advertisement message indicating availability of content from redirector resource 220, and transmits or redirects at least a copy of the message information 105-2 indicating the available content to aggregator resource 140. The redirector resource 220 can be configured to forward the original message to a target recipient in subscriber domain 250-1.

Thus, embodiments herein can include copying the message information 105-2 and transmitting the copied message information 105-2 to the processing resource 135 managed by the first content service provider 120-1.

In this or any other suitable manner, the aggregator resource 140 communicates availability of the content as indicated by the message information 105-2 to processing resource 135 managed by the first content service provider 120-1. In a manner as previously discussed, the processing resource 135 produces content guide 160, which is made available to subscriber 210-1 for viewing.

As mentioned, the processing resource 135 (and corresponding components aggregator resource 140 and/or content guide generator resource 150) managed by the first content service provider 120-1 produces the content guide 160 to indicate a combination of the content available to the subscriber 210-1 for retrieval from the second service provider 120-2 as specified by the message information 105-2 and content available to the subscriber 210-1 for retrieval from the first content service provider 120-1 over a shared cable network path.

More specifically, as discussed in more detail later in this specification, the first content service provider 120-1 may be a cable network service provider. In such an instance, the cable network service provider may enable the subscriber 210-1 to selectively retrieve and/or tune to cable network content such as television programs, video on demand, etc.

The cable network service provider (such as the first content service provider 120-1) may also provide Internet services or other similar network services to the subscriber 210-1 enabling the respective subscriber 210-1 to retrieve so-called over-the-top content from content service provider 120-2 over the Internet. In such an instance, the generation and distribution of content guide 160 enables the subscriber 210-1 to view a combination of content available from the cable network service provider and the second content service provider 120-2 that makes the over-the-top content (such as $3^{rd}$ party content from Hulu™, Netflix™, Amazon™, etc.) available over the Internet.

According to conventional techniques, each $3^{rd}$ party content service provider can offer only a single guide indicating content available from the service provider the corresponding subscriber. The guide information typically must be retrieved from a dedicated web site managed by the content service provider. In contrast to conventional techniques, embodiments herein include combining content availability information into a consolidated content guide 160.

As previously mentioned, the message information 105-2 can be or include content advertisement messages or advertisements generated by the content service provider 120-2 to indicate availability of content from the content service provider 120-2. In one embodiment, the content advertisement messages are transmitted on a regular basis to continuously notify the subscriber 210-1 of the content available to the subscriber 210-1.

Additional and more specific embodiments of redirecting content advertisement messages are described below in FIGS. 4, 5, and 6.

Figure 3:
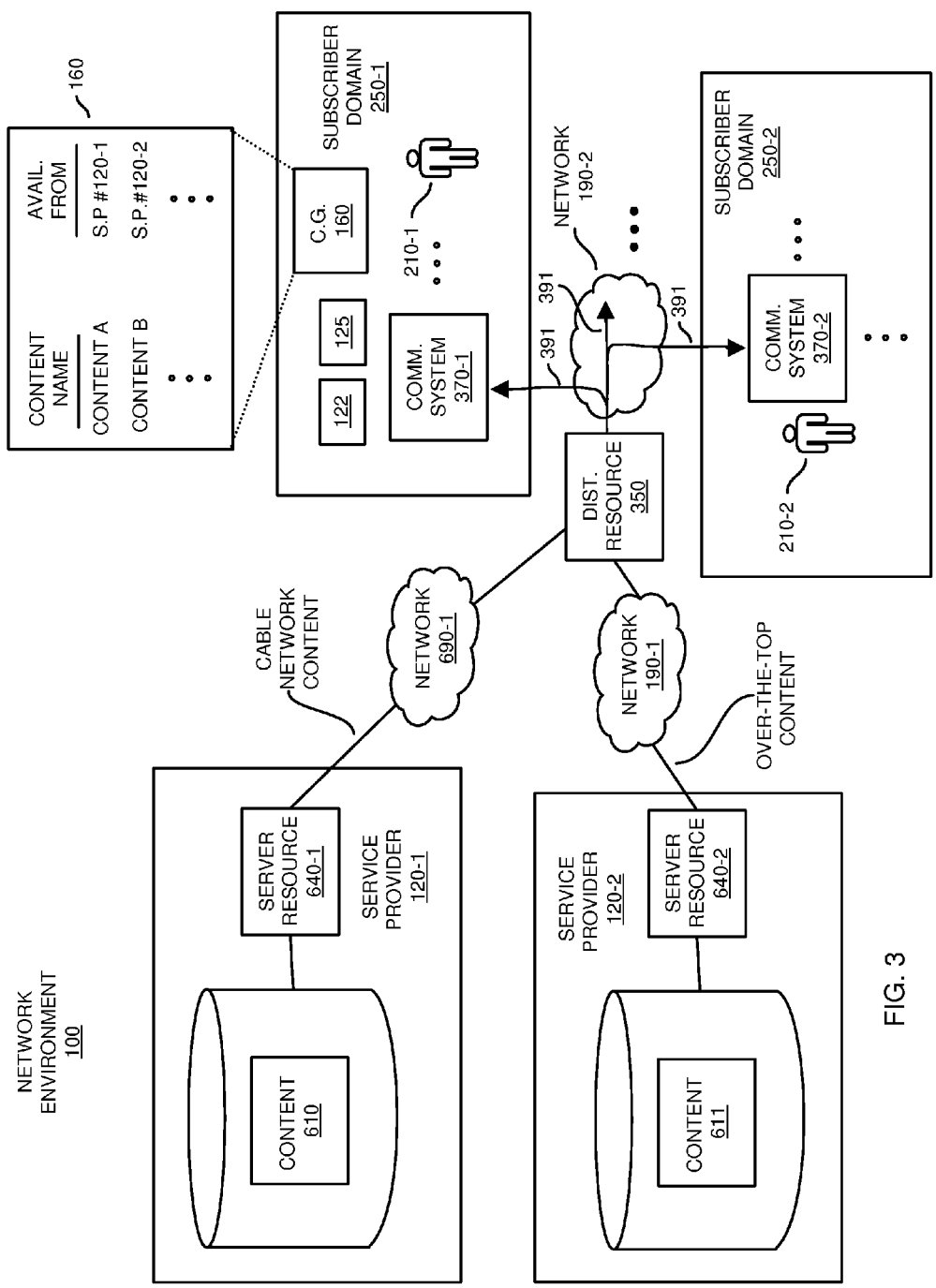
FIG. 3 is an example diagram illustrating distribution and use of a consolidated content guide according to embodiments herein.

FIG. 3 is an example diagram illustrating distribution and use of a content guide according to embodiments herein.

As shown, network environment 100 includes server resource 640-1. Server resource 640-1 can be a cloud server or other cable network equipment configured to distribute content A (such as cable network type content) over cable network resources 690-1 to distribution resource 350. By way of a non-limiting example, the distribution resource 350 can be and/or include a gateway resource, customer edge router, cable modem termination system, etc. Distribution resource 350 distributes content available from service provider 120-1 over bandwidth in shared communication link 391 in network 190-2.

In one embodiment, the bandwidth in shared communication link 391 is allocated into at least a first portion and a second portion. The first portion of bandwidth capacity in the shared communication link 391 can support IP data packet traffic in which data is delivered based on network addresses. Devices in the cable network environment that use the shared communication link are assigned appropriate network addresses to send and receive data. The second portion of bandwidth capacity can support QAM (Quadrature Amplitude Modulated) data transmissions in which content is modulated onto and transmitted over one or more carrier frequency in the shared communication link 391. A respective subscriber tunes to a QAM channel to retrieve content over the second bandwidth.

In one embodiment, note that the subscriber is not limited to receiving content from service provider 120-1 over QAM channels. For example, the subscriber 210-1 can initiate retrieval of content from the first content service provider 120-1 via either tuning to appropriate QAM channels and/or receiving the content as IP data packets depending which mode content is made available for retrieval by a respective content service provider.

In accordance with further embodiments, the subscriber can retrieve content B from the content service provider 120-2 as IP data packets.

By further way of a non-limiting example, shared communication link 391 can be any suitable type of physical or non-physical resource (e.g., communication link, bandwidth, logical channel, coaxial cable, wireless, fiber optic link, etc.) that provides connectivity between distribution resource 350 and each of multiple subscriber domains 250 (e.g., subscriber domain 250-1, subscriber domain 250-2, etc.).

As mentioned, shared communication link 391 enables each of multiple subscribers 210 (e.g., subscriber 210-1, subscriber 210-2, etc.) in a respective service group to share bandwidth on a communication link and retrieve content from different sources. For example, the subscribers 210 can tune a respective communication device to play back content from received from content service provider 120-1. Content A can be content such as scheduled cable television programs, video on demand programs, etc., available to each of the subscribers 210 that shares use of communication link 391 and that subscribe to services provided by content service provider 120-1.

As previously discussed, in addition to subscribing to cable network services and corresponding content, each of the subscribers 210 can subscribe to Internet services (such as over-the-top services) available from content service provider 120-1. Via the Internet services, and use of a portion of bandwidth in the shared communication link 391, each of the subscribers can initiate retrieval of over-the-top content from one or more content service providers such as service provider 120-2 for playback in a respective subscriber domain. In other words, as discussed herein, the subscriber 210-1 can initiate retrieval of over-the-top content from service provider 120-2 using Internet services provided by service provider 120-1.

Thus, first content such as content A can be available to the subscribers over a first portion of bandwidth (such as QAM channels) on the shared communication link 391. Second content such as content B from a second content service provider 120-2 can be available to the subscribers over a second portion of bandwidth (such as bandwidth that supports IP type services) on the shared communication link 391.

In this example embodiment, the subscriber 210-1 retrieves content guide 160 for viewing on a respective display screen. The content guide 160 can be retrieved from the content service provider 120-1 in any suitable manner. For example, in one non-limiting example embodiment, the consolidated content guide 160 can be retrieved by the subscriber 210-1 from a web page.

Via the content guide 160, the subscriber 210-1 is able to view content available from both content service providers 120-1 and 120-2.

In certain instances, a portion of the content available from the different content service providers is the same. In such an instance, the content can be retrieved from each of the content service providers. The same content may be available in different formats. For example, one version of content may allow playback without commercials, another version of the content may allow playback of content without commercials, or different aspect ratios, display resolutions, CODECS, formatting, etc.

For cases in which the same content is available from multiple different service providers, the content guide generator resource 150 can generate content guide 160 to indicate pricing information so that the subscriber 210-1 is able to determine how much the content would cost to retrieve from the different resources.

As a more specific example, the content guide 160 can indicate that the movie "Gone With The Wind" is available for consumption from both content service provider 120-1 and content service provider 120-2. The content guide 160 can indicate that the movie "Gone With The Wind" can be rented for viewing from the content service provider 120-1 for $3.99. The content guide 160 can indicate that the movie "Gone With The Wind" can be rented for viewing from the content service provider 120-2 for $7.99. In this example embodiment, via the content guide 160, the subscriber 210-1 can determine which of the content service providers to retrieve and view respective content (e.g., "Gone With The Wind").

In further embodiments, the subscriber 210-1 generates a request to retrieve and view content guide 160. As mentioned, content guide 160 can be retrieved in any suitable manner.

For example, the subscriber 210-1 can be configured to generate a request to retrieve the content guide 160 from a web site over the Internet. In accordance with further embodiments, the subscriber 210-1 can initiate retrieval of the content guide 160 via inputting an appropriate command to a set-top box that initiates retrieval and subsequent display of the content guide 160 on a respective display screen driven by the set-top box.

In accordance with another embodiment, the subscriber can initiate retrieval of the content guide 160 via a browser executing on a computer device. The browser can be located in a media player application to retrieve and playback all or a portion of the available content specified in the content guide. By way of a non-limiting example, the content can be retrieved from a respective server resource in accordance with the HTML 5 (HyperText Markup Language 5) protocol.

Thus, embodiments herein can include: in response to receiving a request from the subscriber entity to view content guide 160, the content service provider 120-1 initiates distribution of the content guide 160 for viewing by the subscriber 210-1.

Further embodiments herein can include receiving selection of content displayed in the content guide 160 and initiating display of the selected content. As an example, the content service provider 120-1 can receive selection (by the subscriber 210-1) of a particular title of content displayed in a rendition of the content guide 160 displayed on a respective display device in the subscriber domain 250-1. In response to the selection, the corresponding processing device (e.g., set-top box, computer device, etc.) receives the selection and initiates retrieval of the selected content from the appropriate resource. The target resource storing the requested content receives the selection and initiates retrieval and distribution of the selected content to the subscriber entity.

As a more specific example, assume that the subscriber 210-1 selects content A for viewing via a service such as video on demand offered by the content service provider 120-1. The server resource 640-1 operated by content service provider 120-1 receives the command from subscriber 210-1 and responds to the request by retrieving and distributing requested content A over network 690-1 to distribution resource 350. Distribution resource 350 transmits content A over shared communication link 391 to a respective device operated by subscriber 210-1 for playback.

Assume that the subscriber 210-1 selects content B for viewing. In one embodiment, the device operated by the subscriber to view the content guide 160 launches an appropriate application to retrieve respective content B as streaming content from the second content service provider 120-2. After providing appropriate subscriber identity and authorization information to the content service provider 120-2, to retrieve content, the subscriber generates a request for content B over the Internet service (as provided by content service provider 120-1) to server resource 640-2 managed by content service provider 120-2. In response to the request for content B, the server resource 640-2 responds to the request by retrieving and distributing requested content B over network 190-1 via distribution resource 350 using an appropriate Internet Protocol and to a network address of the requesting playback device operated by the subscriber 210-1. Distribution resource 350 participates in transmission of content B as over-the-top content over shared communication link 391 to a respective device operated by subscriber 210-1 for playback.

In this manner, via an appropriate target network address of the playback device in subscriber domain 250-1, the server resource 640-2 is able to transmit content B to a respective device operated by subscriber 210-1 for storage and/or subsequent playback.

In accordance with further embodiments, note that the content available from the content service provider 120-1 also can be available as so-called IPTV (Internet Protocol Television) as opposed to a QAM channel. In such an instance, the available content A displayed in a rendition of the content guide 160 can be associated with a respective network address (or multiple network addresses) indicating a respective resource (e.g., server resource 640-1) from which the respective content A can be retrieved. In response to receiving selection of a title (e.g., reference) of content A displayed in the rendition of the content guide 160, a respective device in the subscriber domain 250-1 initiates IP communications with the server resource 640-1 to retrieve content A for playback.

As previously discussed, the available content B displayed in the content guide 160 can be associated with a respective network address (or multiple network addresses) indicating a respective resource (e.g., server resource 640-2) from which the respective content B can be retrieved. In a similar manner as previously discussed, in response to receiving selection of content B displayed in the rendition of the content guide 160, a respective device in the subscriber domain 250-1 initiates communications with the server resource 640-2 to retrieve content B for playback.

Note that there are instances in which the content guide 160 can include an extensive listing of titles of content that are retrievable from multiple different resources in network environment 100. The list of available content may be too large to simultaneously display all available titles of content on the display screen. One embodiment herein includes a search function supporting search capability. The search function can be configured to execute on the device operated by the subscriber 210-1. In response to receiving search criteria from the subscriber to find, for example, a specific title of content, the search function searches the content guide 160 for availability of content as specified by the search criteria.

In one non-limiting example embodiment, assume that particular content satisfying the search is available from both the first content service provider 120-1 and the second content service provider 120-2. In response to detecting that the content as specified by the search criteria is available from both the first content service provider 120-1 and the second content service provider 120-2, the search function initiates display of an appropriate message to the subscriber 210-1 notifying the subscriber that the content as specified by the search criteria is available from both the first content service provider and the second content service provider. Notification can include updating a display of the content guide 160 on a respective display screen to indicate the content that satisfies the search criteria.

In similar manner as previously discussed, a display function can be configured to initiate display of pricing information to indicate the cost of renting (i.e., retrieving and viewing) the title of content from each of multiple different content service providers. Accordingly, a subscriber can make an informed decision as to which content service provider to retrieve the respective content.

In one embodiment, the subscriber domain includes communication device 122 (e.g., a first client) and communication device 125 (e.g., a second client). Each of the communication devices can include a respective media player application to play back retrieved content. As previously discussed, the subscriber 210-1 can initiate display of content guide 160 on a respective communication device. Each respective communication device can retrieve content B from server resource 640-2 via generation of one or more content requests (such as HTTP (Hyper Text Transfer Protocol) requests) to server resource 640-2.

Figure 4:
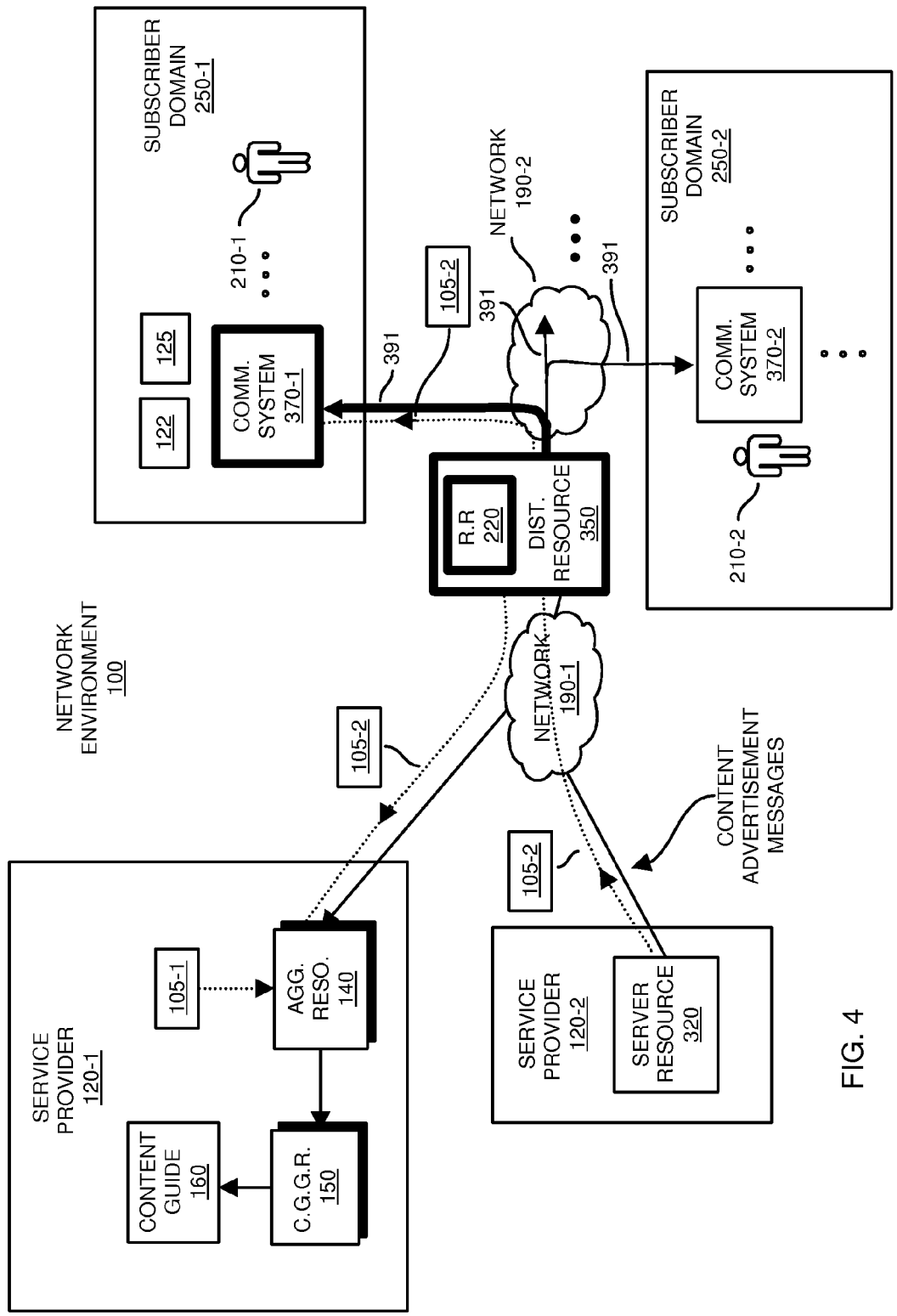
FIG. 4 is an example diagram illustrating redirection of content advertisement messages to an aggregator resource according to embodiments herein.
Figure 5:
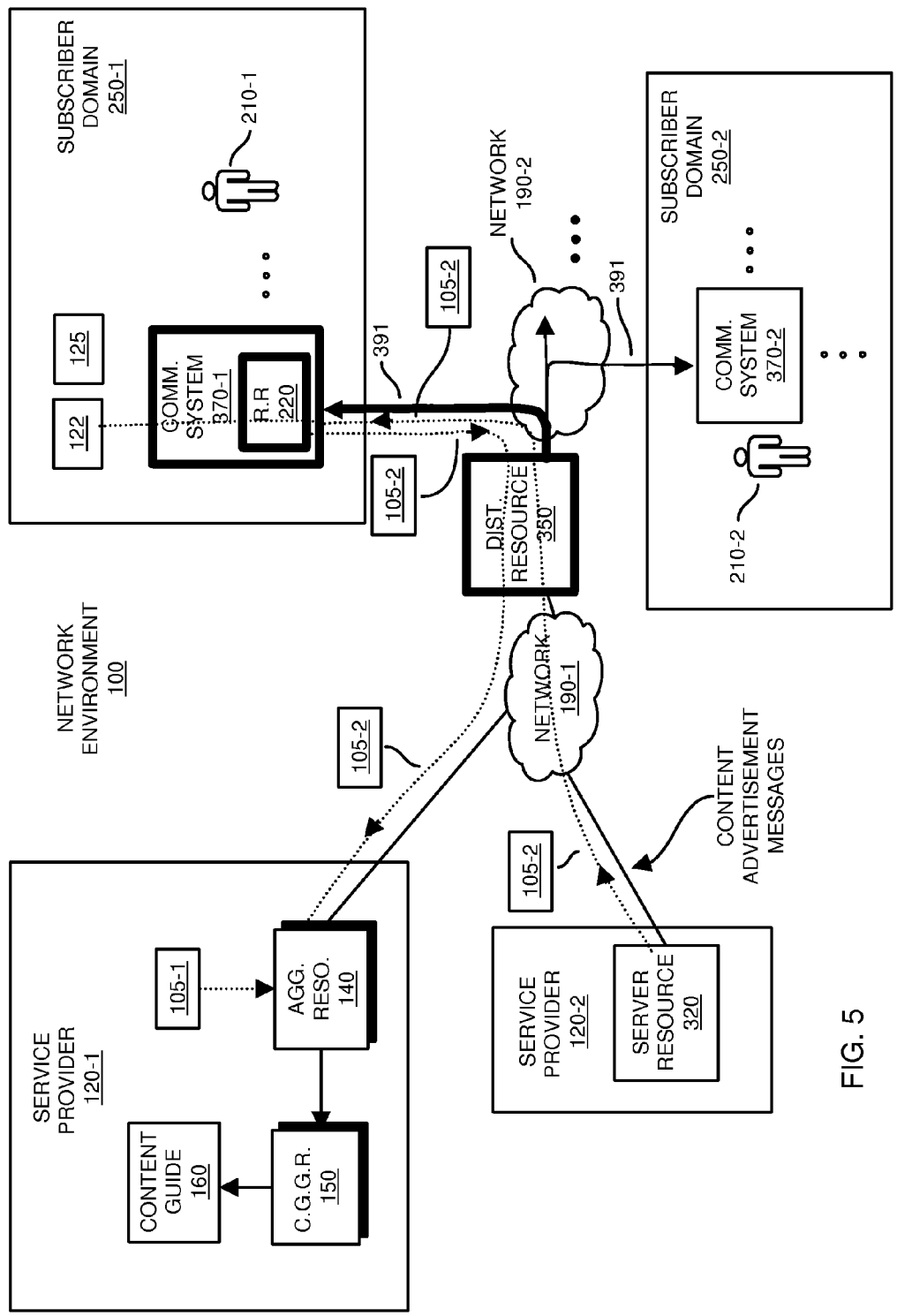
FIG. 5 is another example diagram illustrating redirection of content advertisement messages to an aggregator according to embodiments herein.
Figure 6:
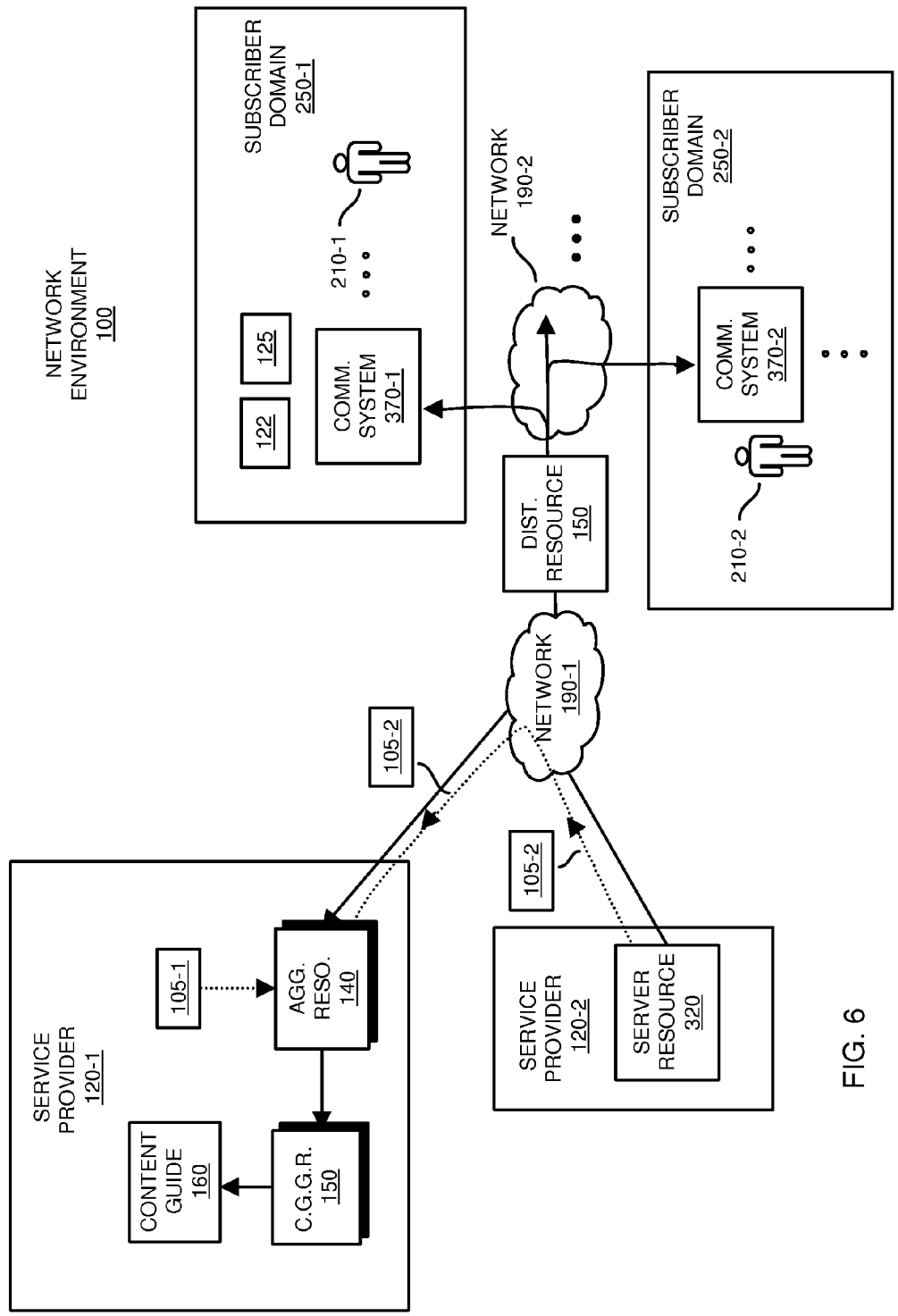
FIG. 6 is an example diagram illustrating transmission of content availability information to an aggregator resource according to embodiments herein.

FIGS. 4, 5, and 6 illustrate multiple example ways in which to redirect messages to an aggregator resource according to embodiments herein.

Conventional service discovery is generally done in the home today by way of service advertisements. Examples of conventional discovery can be done via mDNS protocol, Microsoft's LLMNP, and the neutral DLNA, etc. Embodiments herein can include extending one or more of these protocols to allow them to traverse a home network with multiple hierarchies of networks. For example, the extended protocol as discussed herein can be configured to support distribution of content advertisement messages to advertise the availability of different content from different resources across networks in the hierarchy. Such methods may require devices such as routers in each network to be aware of and support a content availability protocol supporting advertisements of available content.

In one embodiment, when a cable network-owned router (such as a home gateway, CMTS, or IP-capable set top, etc., managed by the first content service provider 120-1) receives content advertisement message (i.e., messages indicating availability of content), the device relays those messages to a cable network server, which consolidates the information with the cable network's own available content and services, and present them in content guide 160 to the user.

In accordance with other embodiments, the first content service provider 120-1 can be configured to send titles and metadata to the gateway in the home, which could participate in the content discovery process and produce the content guide 160.

More specifically, FIG. 4 is an example diagram illustrating redirection of content discovery messages to an aggregator resource in a cable network environment according to embodiments herein.

In this example, content service provider 120-2 manages (e.g., owns, operates, controls, etc.) server resource 320. In one embodiment, server resource 320 produces message information 105-2 (e.g., content availability information). The message information 105-2 can include appropriate network addresses to direct and/or transmit it to a personal network or devices in subscriber domain 250-1.

In one embodiment, any of one or more of the communications between parties can be performed over a secured link such as a virtual private network, a tunnel, etc.

In one embodiment, the content service provider 120-2 transmits message information 105-2 (e.g., one or more content advertisement messages indicating content available from server resource 320) to one or more computer devices subscriber domain 250-1. The server resource 320 (as controlled by content service provider 120-2) can transmit the message information 105-2 over an Internet service (subscribed to by the subscriber 210-1) and provide it to devices 122 and 125 by content service provider 120-1.

Because the content service provider 120-1 controls at least a portion of network environment 100, the content service provider 120-1 has the ability to execute a redirector resource 220 (such as executed switch to detect content advertisement messages) in any suitable location along a network path between the distribution resource 350 (e.g., a CMTS, edge router, etc.) and the communication system 370-1 (e.g., a cable modem, home edge router, home gateway, etc.). Each of one or more different computer devices such as communication devices 122 and 125 can receive and transmit communications through communication system 370-1 to remote resources in network environment 100.

As previously discussed, the redirector resource 220 can be configured to monitor data traffic (e.g., messages, data packets, etc.) passing through a shared cable network path managed by the first content service provider 120-1. In this example embodiment, the distribution resource 350 executes the redirector resource 220 to monitor data traffic.

Based on the monitoring, assume that the redirector resource 220 detects presence of message information 105-2 transmitted to a device in subscriber domain 250-1. The redirector resource 220 can be configured to analyze the respective data traffic to subscriber 210-1 for specific messages such as messages indicating available content from a content service provider such as content service provider 120-1.

One way to detect presence of content availability message information passing through distribution resource 350 is to identify a respective network address associated with subscriber domain 250-1 and monitor any traffic passing through distribution resource 350 that has the address of the subscriber domain 250-1.

In addition to or as an alternative to monitoring data traffic based on network addresses, the redirector resource 220 also can be configured to process the communications to subscriber domain 250-1 to determine which of the messages includes content availability information.

In response to detecting that traffic through the distribution resource 350 is targeted to the subscriber domain 250-1 and/or is an advertisement message indicating availability of content, the redirector resource 220 transmits at least a copy of the message information 105-1 to the aggregator resource 140.

In one embodiment, the redirector resource uses a network address of the aggregator resource 140 to forward the message information 105-2 over network 190-1 to the aggregator resource 140.

In a manner as previously discussed, the aggregator resource 140 combines content availability information received from content service provider 120-2 and content service provider 120-1. For example, the aggregator resource 140 receives message 105-1 from the first content service provider 120-1. The aggregator resource 140 receives the second message information 105-2 indicating availability of the content from the content service provider 120-2 as a redirect message from the redirector resource 220.

In a manner as previously discussed, based on the combined content availability information from multiple sources, the content guide generator resource 150 produces the content guide 160.

FIG. 5 is an example diagram illustrating redirection of content advertisement messages to an aggregator according to embodiments herein.

As previously discussed, the redirector resource 220 can be located in any suitable location in network environment 100. As shown in this example embodiment, the redirector resource 220 resides in communication system 370-1 such as a cable modem, video gateway, or home gateway resource disposed in subscriber domain 250-1.

As previously discussed, the server resource 320 can be configured to transmit one or more content advertisement messages to subscriber domain 250-1. For example, the server resource 320 can send to a device or appliance such as communication device 122, communication device 125, etc. Each of the communication devices can then send or distribute the content advertisement messages to one or more other resources in subscriber domain 250-1.

In one embodiment, the redirector resource 220 in communication system 370-1 monitors communications received over the network path to subscriber 210-1. As previously discussed, monitoring the network path can include processing the messages transmitted over the shared cable network path to identify a set of at least one message transmitted to the subscriber domain 250-1 (or corresponding devices therein). In response to detecting presence of one or more content advertisement messages indicating availability of content, the redirector resource 220 redirects at least a copy of the corresponding message information 105-2 to aggregator resource 140.

In a manner as previously discussed, the aggregator resource 140 combines content availability received from content service provider 120-2 and content service provider 120-1. For example, the aggregator resource 140 receives message information 105-1 from a resource managed by the first content service provider 120-1. The aggregator resource 140 also receives the second message information 105-2 (as a redirect message) from redirector resource 220. The message information 105-2 indicates availability of the content from the content service provider 120-2.

FIG. 6 is an example diagram illustrating transmission of message information indicating available content according to embodiments herein.

In this example embodiment, the aggregator resource 140 receives message information 105-2 directly from server resource 320 managed by content service provider 120-2.

In accordance with such an embodiment, the aggregator resource 140 (managed by content service provider 120-1) receives notification indicating that the subscriber 210-1 subscribes to content service provider 120-2. The aggregator resource 140 receives the message information 105-2 in any suitable manner. For example, in one embodiment, the aggregator resource 140 generates a request for content availability information from server resource 320 (on behalf of the subscriber 210-1) to learn of content available to the subscriber 210-1 from the content service provider 120-2. The aggregator resource 140 may provide identity and authorization information associated with the subscriber 210-1 to retrieve the content availability information. In response to the query, the aggregator resource 140 forwards the request to a network address assigned to the server resource 320. In response to the request, the server resource 320 forwards message information 105-2 to aggregator resource 140. Accordingly, the aggregator resource 140 can "pull" information from the server resource 320.

Note that the server resource 320 can be configured to automatically "push" the message information 105-2 to the aggregator resource 140. For example, a temporary or continuous communication session can exist between the aggregator resource 140 and the server resource 320. The server resource 320 can be configured to automatically transmit message information messages 105-2 such as one or more content advertisement messages to the aggregator resource 140 to notify aggregator resource 140 of the content that is available to subscriber 210-1.

In a manner as previously discussed, the aggregator resource 140 combines content availability information received from at least content service provider 120-2 and content service provider 120-1. The content guide generator resource 150 produces content guide 160 indicating content available to subscriber 210-1 from different service providers.

Figure 7:
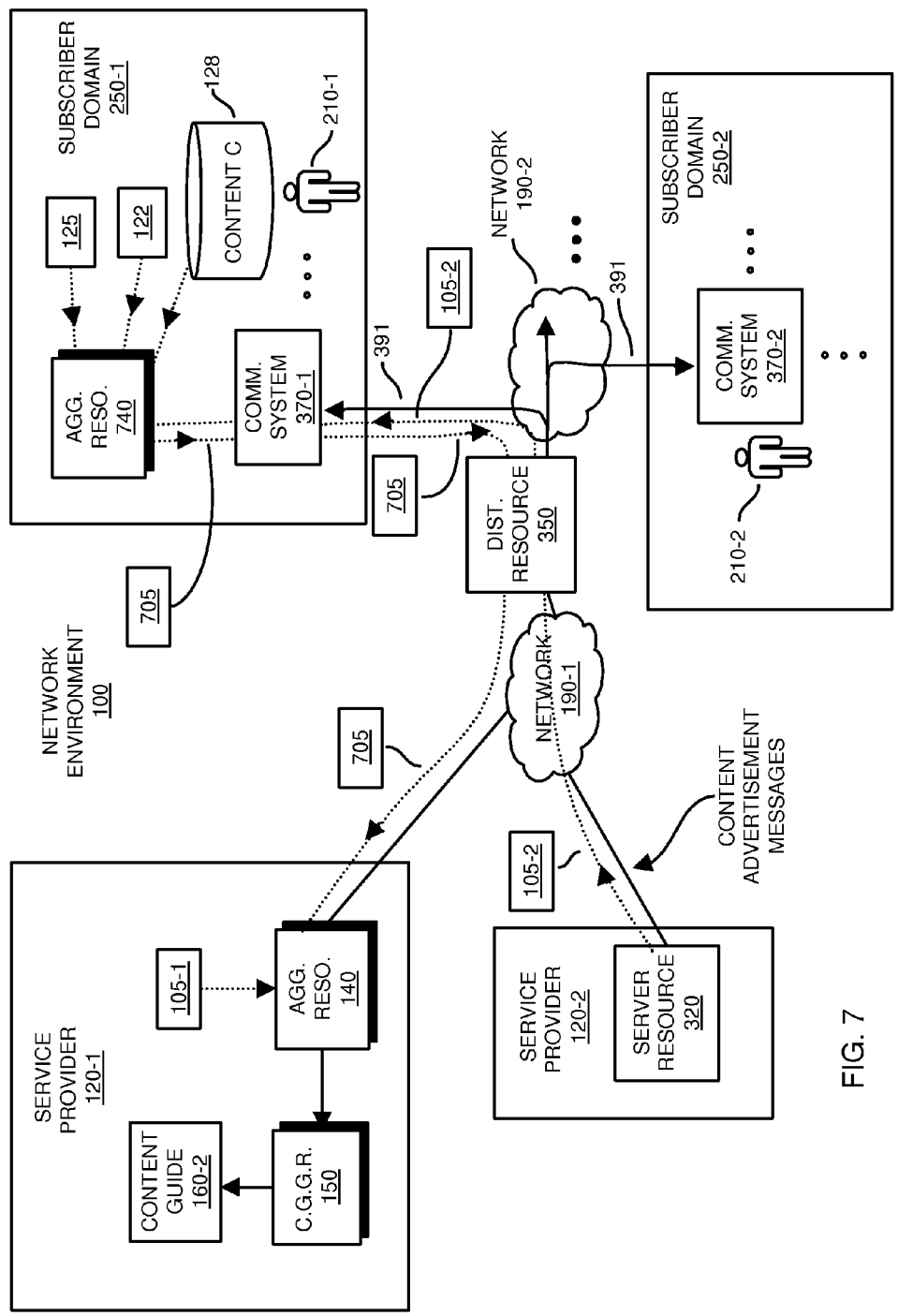
FIG. 7 is an example diagram illustrating discovery of content availability information in a subscriber domain of a cable network environment according to embodiments herein.

FIG. 7 is an example diagram illustrating discovery of content in a network according to embodiments herein.

As previously discussed, the aggregator resource 140 as discussed herein can be disposed at any location in network environment 100 to learn of availability of content from each of different resources.

In this example embodiment as shown in FIG. 7, an aggregator resource 740 is located in a home network environment such as in subscriber domain 250-1. The home network environment can include a hierarchy of network segments interconnecting computer devices. As previously discussed, each of one or more devices in subscriber domain can be configured to generate one or more content advertisement messages (e.g., broadcast message, targeted message, etc.) to indicate availability of respective content. The content advertisement messages can be transmitted across network segments from one device in the subscriber domain 250-1 to another.

For example, assume that: communication device 125 generates one or more content advertisement messages to indicate that content F is available for retrieval from communication device 125 by the subscriber 210-1; communication device 122 generates one or more content advertisement to indicate that content D is available for retrieval by the subscriber 210-1; storage resource 128 generates one or more content advertisement messages to indicate that content C is available for retrieval by the subscriber 210-1; server resource 320 generates one or more content advertisement messages to indicate that content B is available for retrieval from content service provider 120-2 (or server resource 640-2); and so on.

In one embodiment as shown, the aggregator resource 740 located in subscriber domain 250-1 aggregates the content advertisement messages and forwards such information as content availability information 705 to aggregator resource 140. As previously discussed, aggregator resource 140 combines content availability information 705 with content availability information as indicated by message information 105-1 to produce content guide 160-2.

In a further embodiment, if desired, note that the aggregator resource 740 can be configured to also receive message information 105-1 from the content service provider 120-1 as opposed to aggregator resource 140 receiving message information 105-1. In such an instance, the aggregator resource 740 can be configured to forward the combination of all content availability information to content guide generator resource 150 to produce content guide 160-2.

As previously discussed, the content guide generator resource 150 can be located at any suitable location in network environment 100. In one embodiment, the content guide generator resource 150 can be located in subscriber domain 250-1. In such an instance, the aggregator resource 740 would forward the content availability information 705 to the content guide generator resource 150 located in subscriber domain 250-1 to produce content guide 160-2.

Note that a subscriber 210-1 need not be located in the subscriber domain 250-1 to retrieve available content. For example, the subscriber 210-1 can operate a computer device in a coffee shop having public WiFi™ access. Via a connection over a public WiFi™, the subscriber 210-1 is able to access a web page made available by the first content service provider 120-1. Via the web page access, the subscriber 210-1 can retrieve and view the content guide 160-2 and retrieve content for playback. In one embodiment, the subscriber 210-1 may select content stored in a respective set-top box to playback in the computer device operated in the coffee shop. In such an instance, the content service provider 120-1 initiates retrieval and forwarding of the content stored in the respective set-top box to the computer device operated by the subscriber 210-1 in the coffee shop over the WiFi™ connection.

In accordance with further embodiments, the aggregator resource can be located in a set-top box in subscriber domain 250-1. In such an instance, the set-top box can be configured to forward any collected content availability information to a respective content guide generator resource 150 disposed in the cloud (i.e., network).

Figure 8:
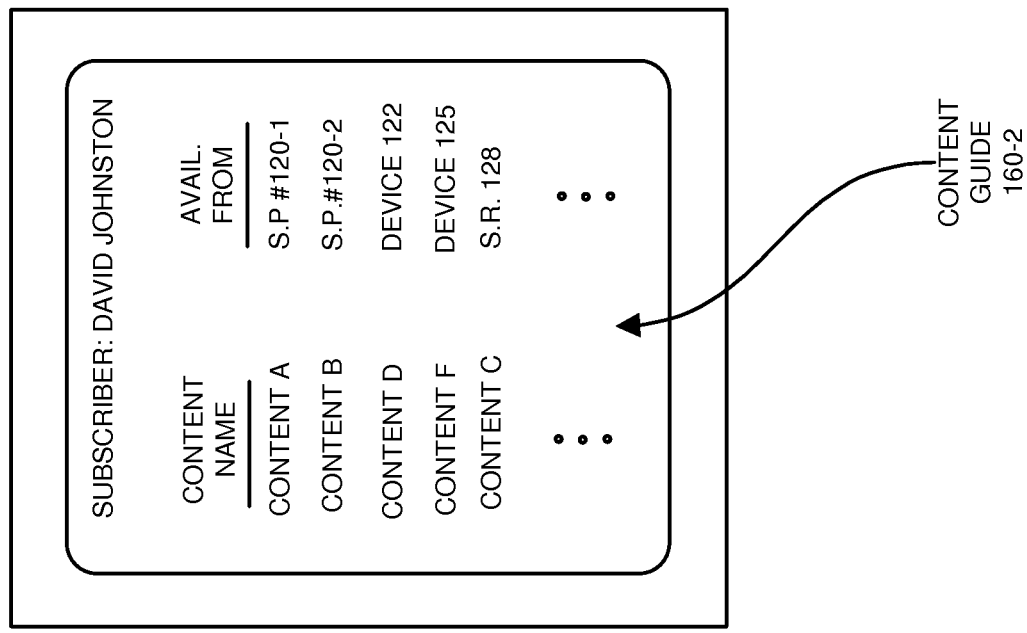
FIG. 8 is an example diagram illustrating a consolidated content guide indicating availability of content from multiple different resources in a cable network environment according to embodiments herein.

FIG. 8 is an example diagram illustrating a content guide indicating availability of content from multiple resources according to embodiments herein.

As previously discussed in FIG. 7, the content guide generator resource 150 produces content guide 160-2 based on received content availability information. In this example embodiment, as indicated by the content guide 160-2, the subscriber 210-1 is able to retrieve content A from service provider 120-1 (or a specific server resource such as server resource 640-1); the subscriber is able to retrieve content B from service provider 120-2 (or a specific server resource such as server resource 640-2); the subscriber is able to retrieve content D from device 122 in the subscriber domain 250-1; the subscriber is able to retrieve content F from device 125 in the subscriber domain 250-1; the subscriber is able to retrieve content C from storage device 128 (e.g., a repository) in the subscriber domain 250-1; and so on.

Figure 9:
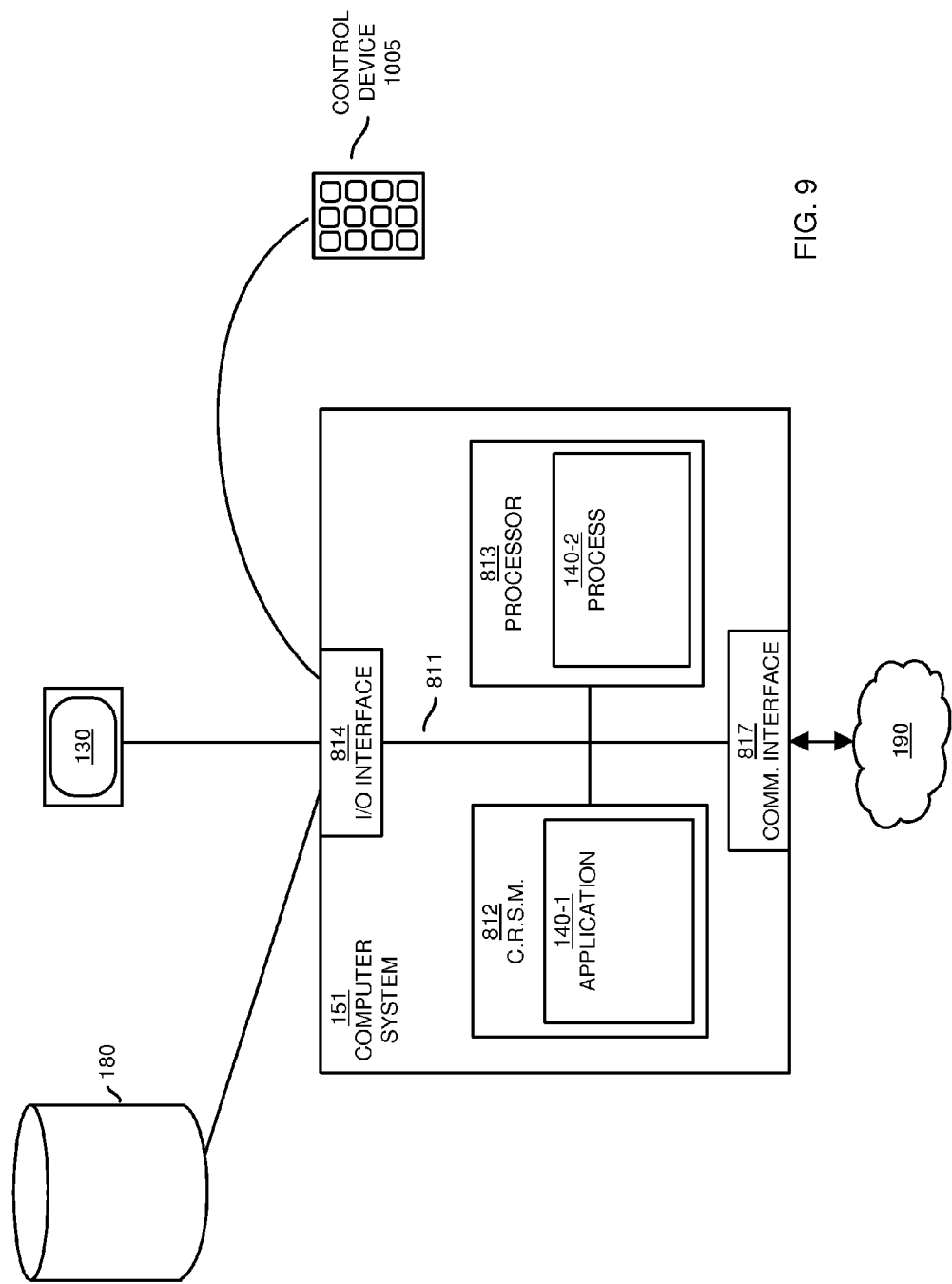
FIG. 9 is a diagram illustrating an example hardware architecture supporting execution of instructions and methods according to embodiments.

FIG. 9 is an example block diagram of a computer system for implementing any of the operations as discussed herein according to embodiments herein.

Computer system 151 can reside any where in network environment 100 and support any of the operations as discussed herein. In one embodiment, the computer system 151 executes application 140-1 to facilitate aggregation or redirection of content availability information to produce a consolidated content guide.

As shown, computer system 151 of the present example can include an interconnect 811 that couples computer readable storage media 812 such as a non-transitory type of media (i.e., any type of hardware storage medium) in which digital information can be stored and retrieved, a processor 813, I/O interface 814, and a communications interface 817.

I/O interface 814 provides connectivity to a repository 180 and, if present, other devices such as a display screen 930, keypad control device 1005, a computer mouse, etc.

Computer readable storage medium 812 can be any hardware storage device such as memory, optical storage, hard drive, floppy disk, etc. In one embodiment, the computer readable storage medium 812 stores instructions and/or data.

Communications interface 817 enables the computer system 150 and processor 813 to communicate over a resource such as network 190 to retrieve information from remote sources and communicate with other computers. I/O interface 814 enables processor 813 to retrieve information stored in repository 180.

As shown, computer readable storage media 812 is encoded with admission control application 140-1 (e.g., software, firmware, etc.) executed by processor 813. Admission control application 140-1 (e.g., encoder application) can be configured to include instructions to implement any of the operations as discussed herein.

During operation of one embodiment, processor 813 (e.g., one or more processor devices) accesses computer readable storage media 812 via the use of interconnect 811 in order to launch, run, execute, interpret or otherwise perform the instructions in application 140-1 stored on computer readable storage medium 812.

Execution of the application 140-1 produces processing functionality such as process 140-2 in processor 813. In other words, the process 140-2 (e.g., redirection, aggregation, content guide generation, etc.) associated with processor 813 represents one or more aspects of executing application 140-1 (e.g., functions supported by aggregator resource 140, redirector resource 220, content guide generator resource 150, etc.) within or upon the processor 813 in the computer system 150.

Those skilled in the art will understand that the computer system 151 can include other processes and/or software and hardware components, such as an operating system that controls allocation and use of hardware resources to execute application 140-1.

In accordance with different embodiments, note that computer system may be any of various types of devices, including, but not limited to, a server resource, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Functionality supported by the different resources will now be discussed via flowcharts in FIGS. 10, 11, and 12. Note that the steps in the flowcharts below can be executed in any suitable order.

Figure 10:
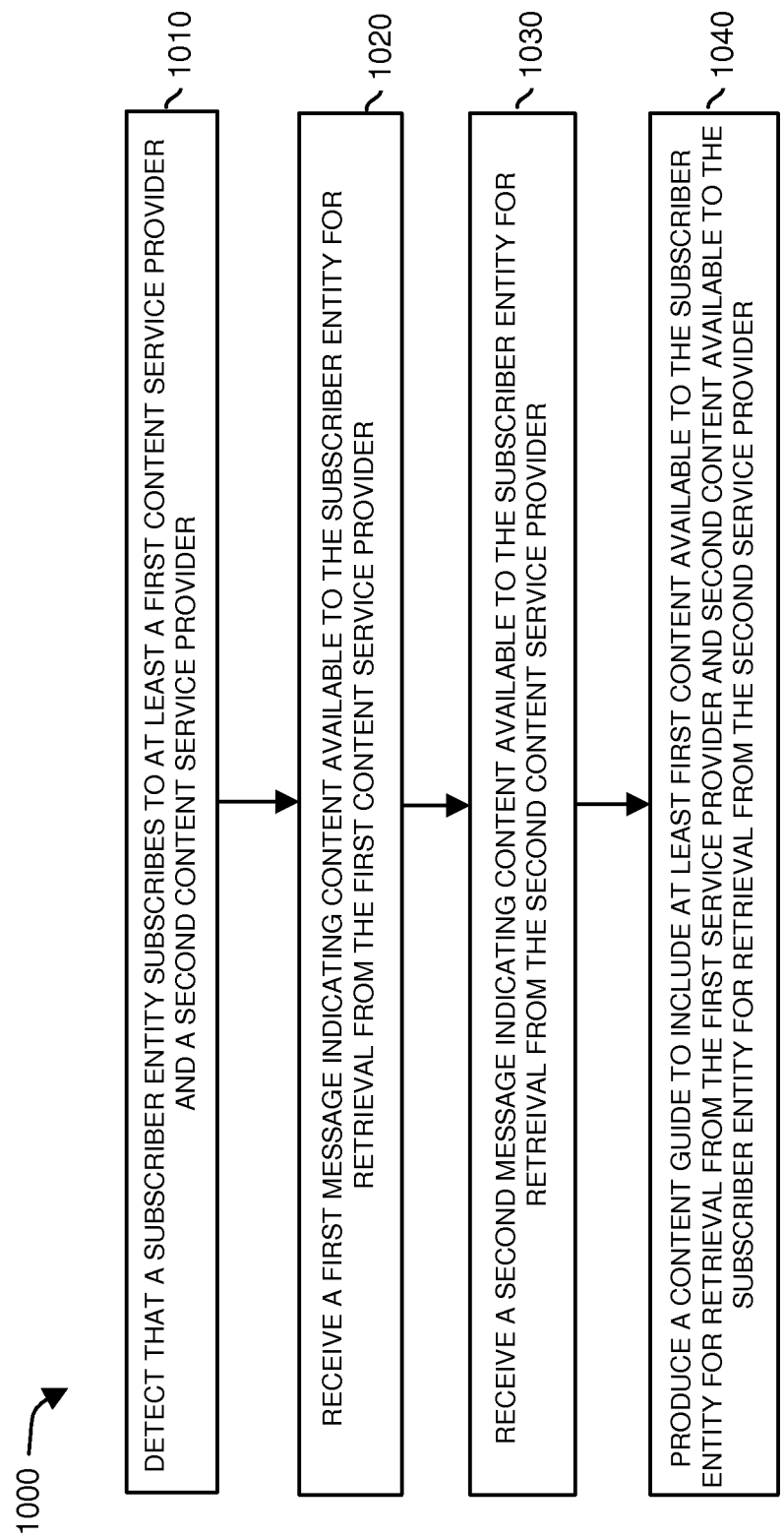
FIGS. 10, 11, and 12 are flowcharts illustrating example methods according to embodiments herein.

FIG. 10 is a flowchart 1000 illustrating an example method according to embodiments. Note that there will be some overlap with respect to concepts as discussed above.

In processing block 1010, aggregator resource 140 detects that a subscriber entity subscribes to at least a first content service provider 120-1 and a second content service provider 120-2.

In processing block 1020, the aggregator resource 140 receives a first message indicating content available to the subscriber entity for retrieval from the first content service provider 120-1.

In processing block 1030, the aggregator resource 140 receives a second message indicating content available to the subscriber entity for retrieval from the second content service provider 120-2.

In processing block 1040, the content guide generator resource 150 produces a content guide 160 to include at least first content available to the subscriber entity for retrieval from the first service provider 120-1 and second content available to the subscriber entity for retrieval from the second service provider 120-2.

Figure 11:
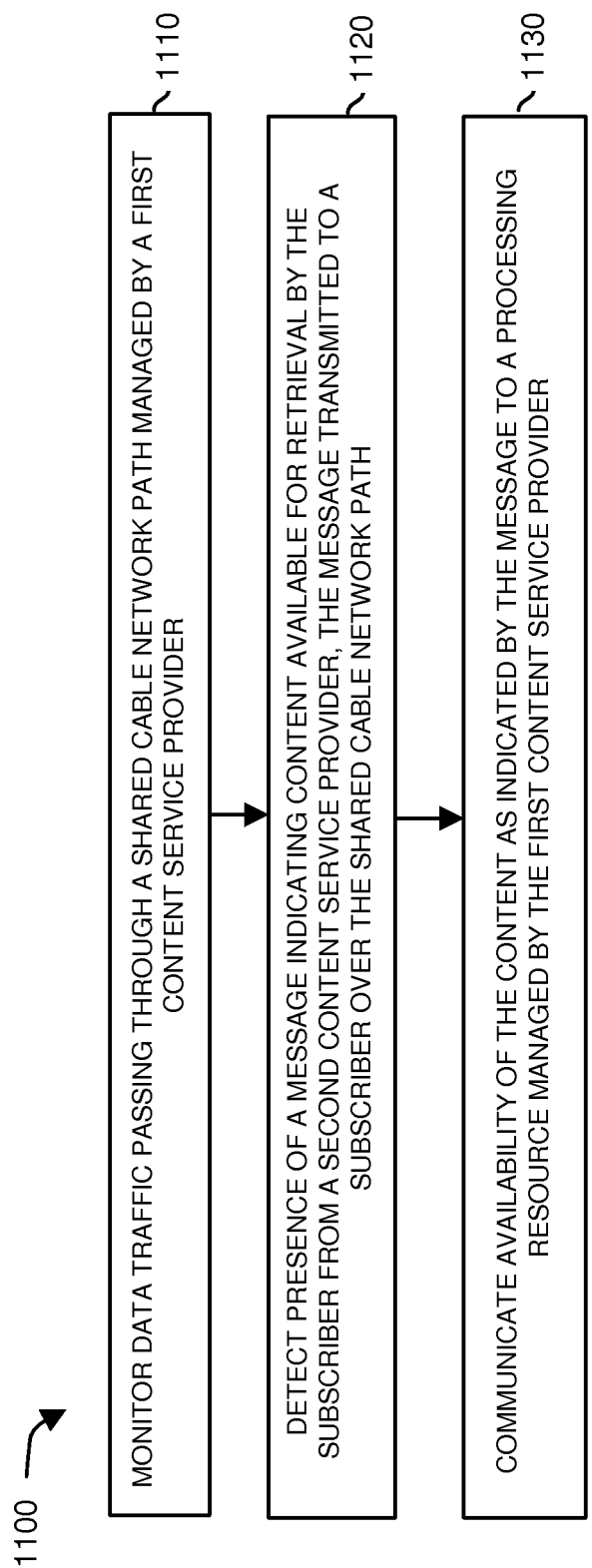

FIG. 11 is a flowchart 1100 illustrating an example method according to embodiments herein. Note that there will be some overlap with respect to concepts as discussed above.

In processing block 1110, the redirector resource 220 monitors data traffic passing through a shared cable network path managed by a first content service provider 120-1.

In processing block 1120, the redirector resource 220 detects presence of a message indicating content available for retrieval by the subscriber from a second content service provider 120-2. The message is transmitted to the subscriber over the shared cable network path.

In processing block 1130, the redirector resource 220 communicates availability of the content as indicated by the message to a processing resource managed by the first content service provider 120-1. In one embodiment, the first service provider 120-1 generates a content guide 160 as discussed herein.

Figure 12:
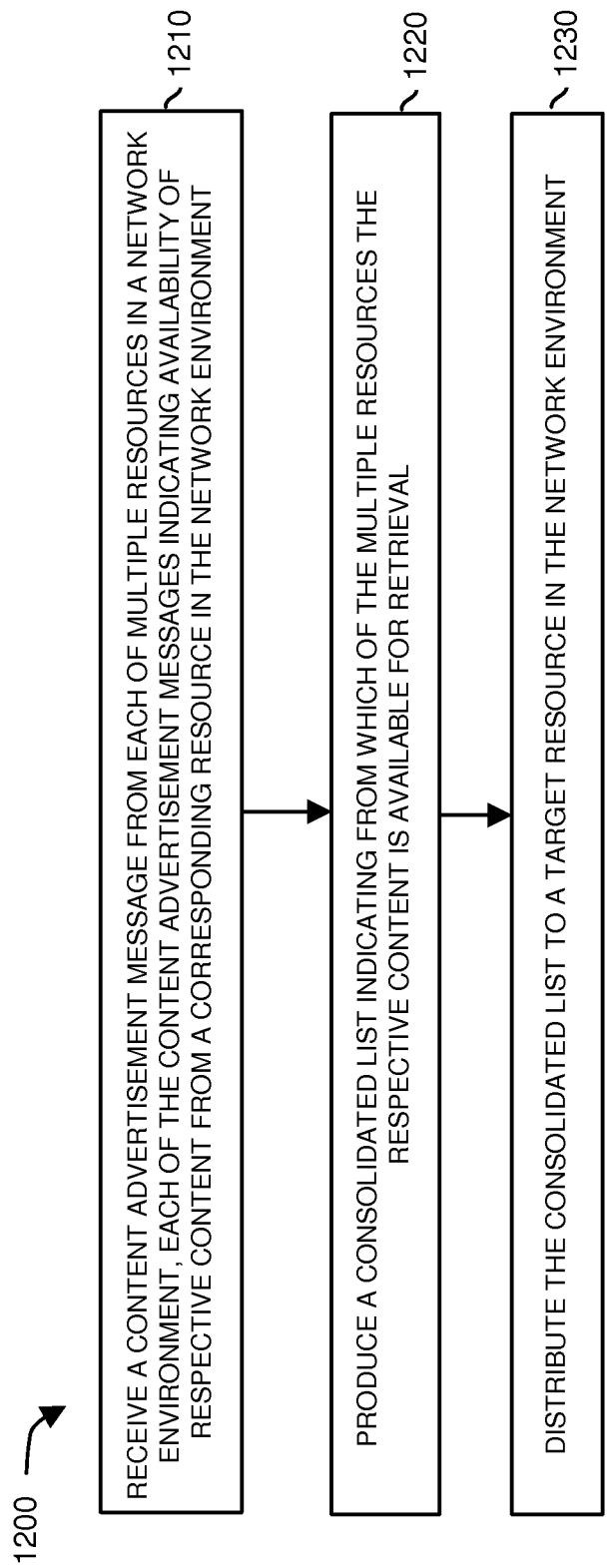

FIG. 12 is a flowchart 1200 illustrating an example method according to embodiments herein. Note that there will be some overlap with respect to concepts as discussed above.

In processing block 1210, the aggregator resource 140 receives a content advertisement message from each of multiple resources in a network environment. Each of the content advertisement messages indicates availability of respective content from a corresponding resource in the network environment.

In processing block 1220, the aggregator resource 140 produces a consolidated list indicating from which of the multiple resources the respective content is available for retrieval.

In processing block 1230, the aggregator resource 140 distributes the consolidated list to a target resource such as a subscriber in the network environment.

Note again that techniques herein are well suited for producing content guides, each of which indicates content available to a corresponding subscriber. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:
   receiving a notification indicating content available to a subscriber entity for retrieval from a first content service provider and a second content service provider;
   producing a content guide to include a unified listing of multiple entries of available content specifying: i) first content available to the subscriber entity for retrieval from the first content service provider, and ii) second content available to the subscriber entity for retrieval from the second content service provider; and
   transmitting the content guide over a shared communication link operated by the first content service provider to the subscriber entity, the first content service provider controlling allocation of available bandwidth in the shared communication link for delivery of the content over respective channels of the shared communication link.

2. The method as in claim 1, wherein the first content service provider is a cable network service provider that provides the subscriber entity access to the first content over a first portion of the available bandwidth in the shared communication link, the cable network service provider allocating a second portion of the available bandwidth in the shared communication link for delivery of the second content from the second content service provider.

3. The method as in claim 2, wherein the cable network service provider produces the unified listing of multiple entries in the content guide to include a first entry specifying the first content available from the first content service provider and a second entry specifying the second content available from the second content service provider.

4. The method as in claim 3 further comprising:
transmitting the content guide over the shared communication link in response to receiving a request from the subscriber entity to simultaneously view, in the unified listing on a display screen, titles of corresponding content available from a combination of the first content service provider and the second content service provider.

5. The method as in claim 1, wherein the first content service provider is a cable network service provider, the method further comprising:
producing the content guide to indicate that a particular title of content is available for retrieval from both the first content service provider and the second content service provider, the second content service provider providing content delivery services as over-the-top content available for retrieval by the subscriber entity over the shared communication link.

6. The method as in claim 1 further comprising:
producing the content guide to simultaneously display a title of the first content available from the first content service provider and a title of the second content available from the second content service provider.

7. The method as in claim 6 further comprising:
producing the content guide to indicate that the first content is available for retrieval from the first content service provider; and
producing the content guide to indicate that the second content is available for retrieval from the second content service provider.

8. The method as in claim 7 further comprising:
producing a first entry in the content guide to include a first set of text specifying the first content, the first entry indicating that the first content is available for retrieval from the first content service provider; and
producing a second entry in the content guide to include a second set of text specifying the second content, the second entry indicating that the second content is available for retrieval from the second content service provider.

9. The method as in claim 1, wherein the first content service provider is a cable network service provider; and
wherein a first portion of the shared communication link provided by the cable network service provider is allocated by the cable network service provider for delivery of the first content from the first content service provider to the subscriber entity, a second portion of the shared communication link allocated by the cable network service provider for delivery of the second content from the second content service provider over the second portion to the subscriber entity.

10. The method as in claim 1 further comprising:
producing a first entry in the content guide to indicate pricing associated with retrieval of the first content over the shared communication link from the first content service provider; and
producing a second entry in the content guide to indicate pricing associated with retrieval of the second content over the shared communication link from the second content service provider.

11. The method as in claim 10, wherein the first entry is contiguous with the second entry in the content guide, the first content unrelated to the second content.

12. The method as in claim 1 further comprising:
producing the content guide to include first entries and second entries, the first entries indicating different titles of content available from the first content service provider, the second entries indicating different titles of content available from the second content service provider, the first entries in the content guide interspersed amongst the second entries in the content guide, one of the first entries indicating that the first content is available from the first content service provider, another one of the second entries indicating that the second content is available from the second content service provider.

13. The method as in claim 1 further comprising:
associating the first content with a television channel from which the first content is available via tuning;
in response to receiving selection of the first content displayed in a rendition of the content guide, tuning to the television channel to receive the first content;
associating the second content with a network address, the network address indicating a server resource from which to retrieve the second content; and
in response to receiving selection of the second content displayed in the rendition of the content guide, initiating communications with the server resource to retrieve the second content.

14. The method as in claim 1 further comprising:
receiving search criteria from the subscriber entity;
searching the content guide for availability of particular content as specified by the search criteria; and
in response to detecting that the particular content as specified by the search criteria is available from both the first content service provider and the second content service provider, via the content guide, notifying the subscriber entity that the content as specified by the search criteria is available from both the first content service provider and the second content service provider.

15. The method as in claim 2, wherein the first portion of bandwidth supports delivery of the first content from the first content service provider as QAM channels tunable based on input from the subscriber entity; and
wherein the second portion of bandwidth supports delivery of the second content as over-the-top content, the cable network service provider managing delivery of the over-the-top content over the second portion of the bandwidth of the shared communication link from the second service provider.

16. The method as in claim 15, wherein the unified listing of multiple entries includes a first entry specifying the first content available from the first content service provider and a second entry specifying the second content available from the second content service provider.

17. The method as in claim 16 further comprising:
producing the content guide to simultaneously display a title of the first content available from the first content service provider and a title of the second content available from the second content service provider;
producing the content guide to indicate that the first content is available for retrieval from the first content service provider; and
producing the content guide to indicate that the second content is available for retrieval from the second content service provider.

18. The method as in claim 17 further comprising:
associating the first content with a television channel from which the first content is available via tuning;
in response to receiving selection of the first content displayed in a rendition of the content guide, tuning to the television channel to receive the first content;
associating the second content with a network address, the network address indicating a server resource from which to retrieve the second content; and in response to receiving selection of the second content displayed in the rendition of the content guide, initiating communications with the server resource to retrieve the second content using the network address.

19. The method as in claim 1, wherein producing the content guide further comprises:
receiving, from the first service provider, a first message indicating availability of the first content from a first resource operated by the first service provider;
receiving, from the second service provider, a second message indicating availability of the second content from a second resource operated by the second service provider; and
deriving the unified listing of multiple entries to include a title specifying the first content and a title specifying the second content.

20. The method as in claim 19, wherein the title specifying the first content and the title specifying the second content are the same.

21. The method as in claim 1, wherein the first content service provider produces the content guide to include the unified listing of multiple entries of available content.

22. The method as in claim 1, wherein the first content service provider receives notification of the second content from the second content service provider; and
wherein the first content service provider produces the content guide to include the unified listing of multiple entries of available content.

23. A computer system comprising:
computer processor hardware; and
a hardware storage resource coupled to the computer processor hardware, the hardware storage resource storing instructions that, when executed by the computer processor hardware, cause the computer processor hardware to perform the operations of:
receiving notification indicating content available to a subscriber entity for retrieval from a first content service provider and a second content service provider;
producing a content guide to include a unified listing of the multiple entries of available content specifying: i) first content available to the subscriber entity for retrieval from the first content service provider, and ii) second content available to the subscriber entity for retrieval from the second content service provider; and
transmitting the content guide over a shared communication link operated by the first content service provider to the subscriber entity, the first content service provider controlling allocation of available bandwidth in the shared communication link for delivery of the content over respective channels of the shared communication link.

24. The computer system as in claim 23, wherein the first content service provider is a cable network service provider that provides content delivery services over the shared communication link; and
wherein the cable network service provider produces the unified listing of multiple entries to include a first entry specifying the first content available from the first content service provider and a second entry specifying the second content available from the second content service provider.

25. The computer system as in claim 24, wherein the computer processor hardware further supports operations of:
transmitting the content guide over the shared communication link in response to receiving a request from the subscriber entity to simultaneously view, in the unified listing on a display screen, titles of corresponding content available from a combination of the first content service provider and the second content service provider.

26. The computer system as in claim 23, wherein the first content service provider is a cable network service provider, the wherein the computer processor hardware further supports operations of:
producing the content guide to indicate that a particular title of content is available for retrieval from both the first content service provider and the second content service provider, the second content service provider providing content delivery services over the shared communication link provided by the cable network service provider.

27. The computer system as in claim 23, wherein the computer processor hardware further supports operations of:
producing the unified listing in the content guide to simultaneously display a title of the first content available from the first content service provider and a title of the second content available from the second content service provider;
producing the unified listing in the content guide to indicate that the first content is available for retrieval from the first content service provider; and
producing the unified listing in the content guide to indicate that the second content is available for retrieval from the second content service provider.

28. The computer system as in claim 27, wherein the computer processor hardware further supports operations of:
producing a first entry in the content guide to include a first set of text specifying the first content, the first entry indicating that the first content is available for retrieval from the first content service provider; and
producing a second entry in the content guide to include a second set of text specifying the second content, the second entry indicating that the second content is available for retrieval from the second content service provider.

29. The computer system as in claim 23, wherein the first content service provider is a cable network service provider; and
wherein a first portion of the shared communication link provided by the cable network service provider is allocated by the cable network service provider for delivery of the first content from the first content service provider to the subscriber entity, a second portion of the shared communication link allocated by the cable network service provider for delivery of the second content as over-the-top content from the second content service provider to the subscriber entity.

30. Computer-readable storage hardware having instructions stored thereon, the instructions, when carried out by a processing device, causes the processing device to perform operations of:
receiving notification indicating content available to a subscriber entity for retrieval from a first content service provider and a second content service provider;
producing a content guide to include a unified listing of multiple entries of available content specifying: i) first content available to the subscriber entity for retrieval from the first content service provider, and ii) second content available to the subscriber entity for retrieval from the second content service provider; and
transmitting the content guide over a shared communication link operated by the first content service provider to the subscriber entity, the first content service provider controlling allocation of available bandwidth in the shared communication link for delivery of the content over respective channels of the shared communication link.

* * * * *